Patented Jan. 10, 1950

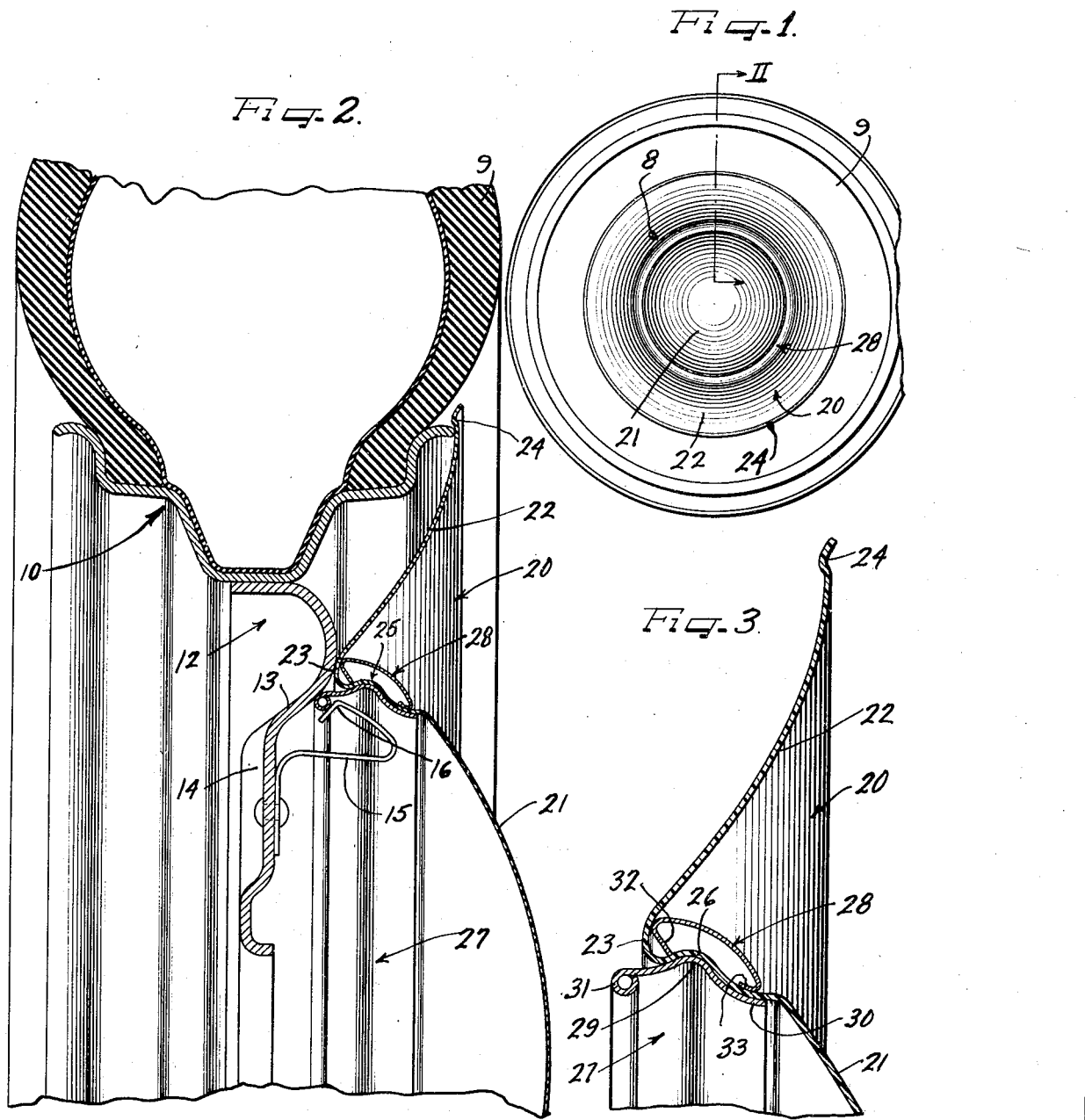

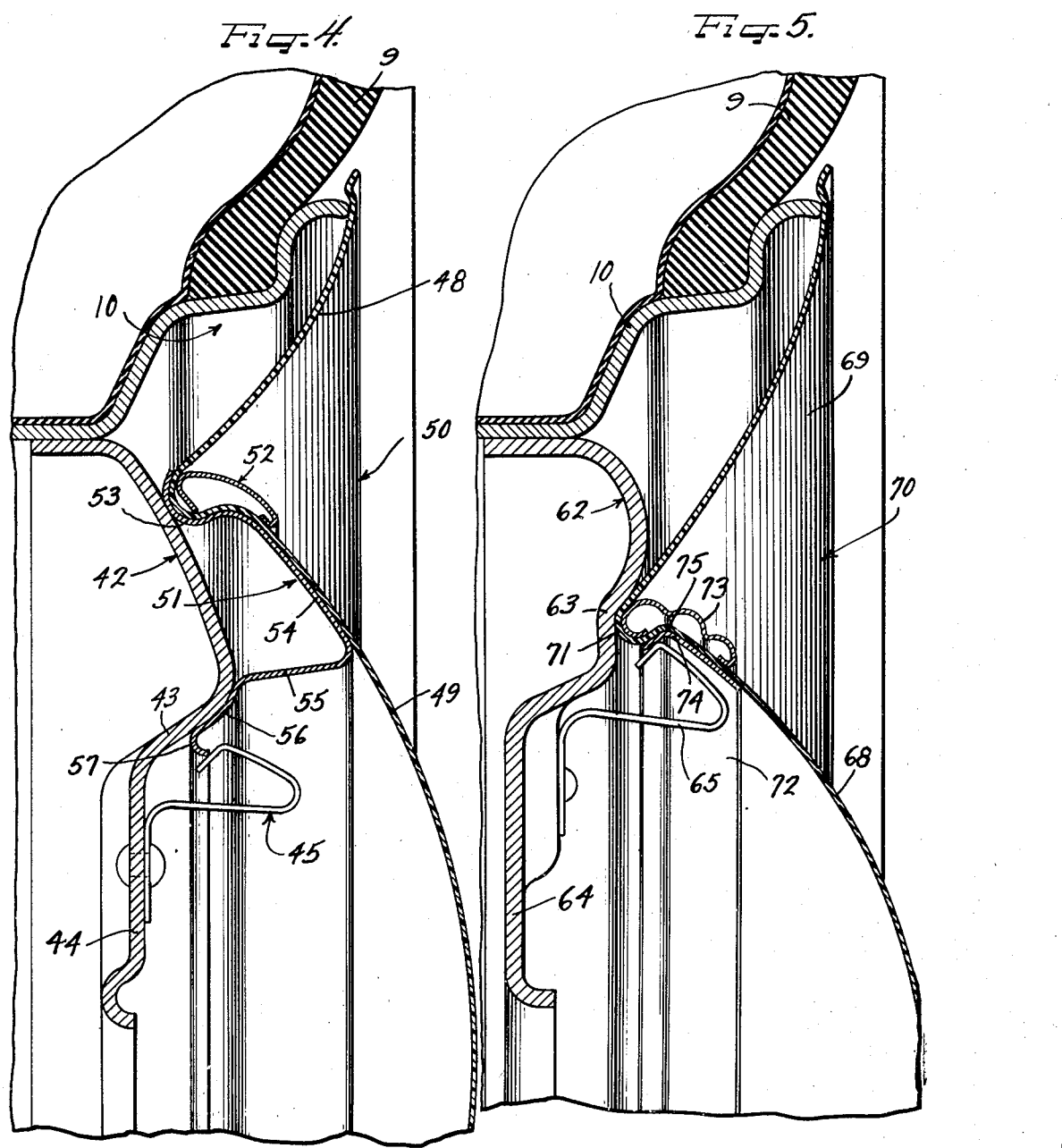

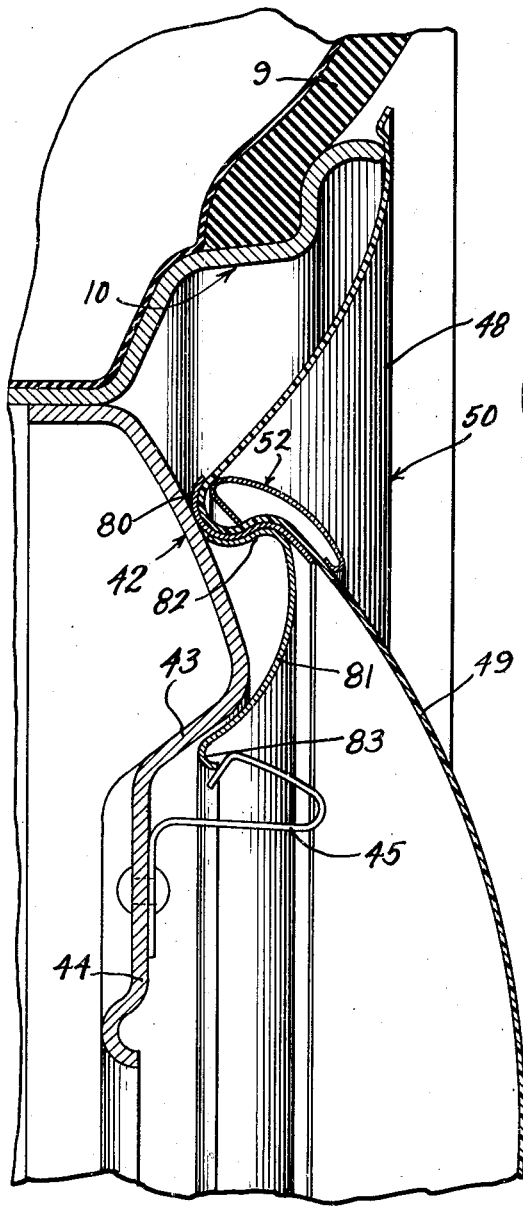
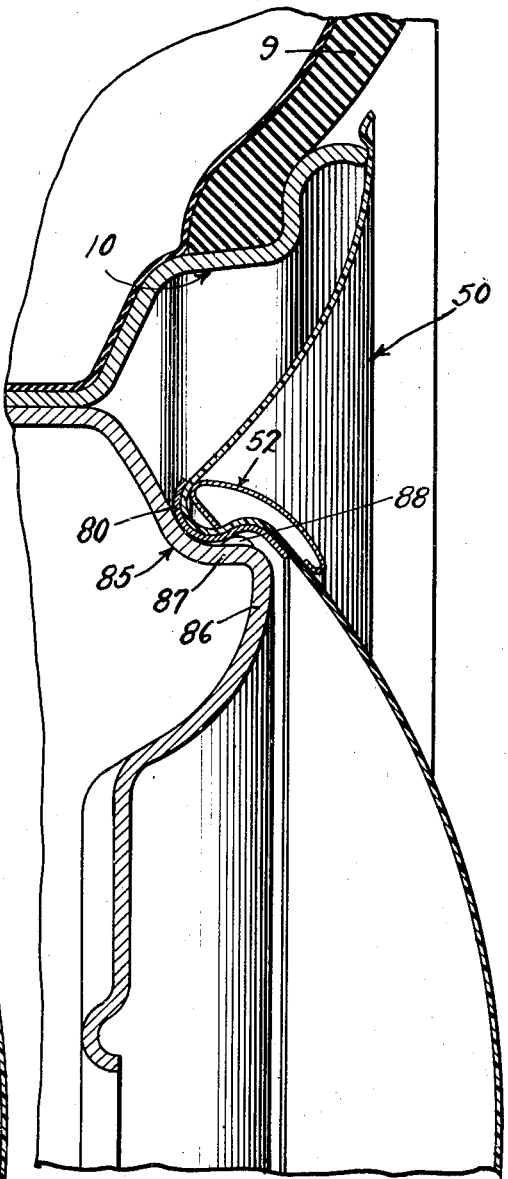

2,493,767

UNITED STATES PATENT OFFICE 2,493,767

WHEEL COVER

George Albert Lyon, Allenhurst, N. J.

Application May 12, 1945, Serial No. 593,467

11 Claims. (Cl. 301—37)

This invention relates to a wheel cover structure and more particularly to a combination plastic and metal cover adapted for use in the covering and ornamenting of an outer side of an automobile wheel.

A first object of this invention is to provide a greatly strengthened and reinforced plastic cover for an outer side of an automobile wheel.

Another object of this invention is to provide a disc-like plastic cover with a reinforcing intermediate ring adapted to engage retaining means on the wheel so as to relieve the plastic cover of undue stress and strain.

Yet another object of the invention is to provide a plastic wheel cover with simple but effective retaining means for holding it on a wheel.

In accordance with the general features of this invention there is provided in a cover structure for a wheel including a tire rim and a body part having centrally arranged cover retaining means, a circular wheel cover of resiliently pliable material self-sustaining as to form and resiliently deflectable without permanent deformation, said cover including radially inner and outer divergent portions connected by a series of transversely curved portions and a curved metal ring on the rear side of the cover for cooperation with the retaining means on the wheel and embracing at least one of said curved cover portions for reinforcing the cover at the junction of its radially inner and outer divergent portions.

Another feature of the invention relates to the forming of the junction between the radially inner and outer portions of the aforesaid cover of a cross-section generally approximating an S in shape and utilizing at least one of the legs of the S to hold the curved metal reinforcing and retaining ring on the cover.

Still another feature of the invention relates to the provision in the aforesaid cover of an outer metal annular bead snapped into the junction of the radially inner and outer portions of the cover for assisting in reinforcing the cover at its area of engagement by the cover retaining means on the wheel.

Other objects and features of this invention will more fully appear from the following detailed description taken in connection with the accompanying drawings which illustrate a single embodiment thereof and in which Figure 1 is a fragmentary side view of a wheel structure having one form of my cover applied thereto;

Figure 2 is an enlarged fragmentary cross sectional view taken on substantially the line II—II of Figure 1 looking in the direction indicated by the arrows;

Figure 3 is an enlarged cross-sectional view taken through a portion of the cover as shown in Figure 2;

Figure 4 is an enlarged fragmentary cross-sectional view similar to Figure 2 illustrating a modified form of structure;

Figure 5 is an enlarged fragmentary cross sectional view similar to Figure 2 of still another form of the invention;

Figure 6 is an enlarged fragmentary cross sectional view similar to Figure 2 showing a further form; and Figure 7 is an enlarged fragmentary cross sectional view similar to Figure 6 showing a different form of cover retaining means on the wheel body part.

As shown in the drawings:

In the accompanying drawings I have illustrated a number of different forms of plastic covers applied to slightly different wheel structures. In every case, however, the wheel structure embraces a conventional automobile tire and tube 9 mounted on a conventional multi-flanged drop center type of tire rim 10. Since these elements are common to all forms, I shall use the same reference numerals throughout the several figures insofar as these elements are concerned.

In each instance, as it is well known in the art, the tire and tube may have a valve stem 8, as shown in Figure 1, by means of which the tire and tube are inflated. It is also contemplated that this stem if it is a relatively short one may be concealed by a plastic cover, whereas on the other hand, if it is a relatively long one, it may extend through an aperture in the wheel cover as shown in Figure 1. In the event the valve stem is concealed by the cover, it is contemplated that the cover, which in each case is made of plastic material, may be flexed away from the wheel to afford access to the valve stem at the rear thereof without necessitating removal of the cover.

These are features that have already been covered in my issued Patent No. 2,368,254 (issued January 30, 1945).

The principal difference in the several forms of the invention relate to the structure of the wheel body or load-bearing member to which the tire rim is attached and to the construction of the cover itself.

In the form of the invention illustrated in Figures 1 to 3, the wheel body or load-bearing part, which carries the tire rim 10, is designated generally by the reference character 12 and comprises a metal stamping having a centrally depressed portion 14 terminating in a radial extending bolt-on flange 14. This flange, as it is well known in the art, is adapted to be attached by screws or bolts (not shown) to a part on the axle such for example as a brake drum. Mounted on the portion 14 are a plurality of spring clips 15 which may be of any suitable number, such for example as three to five. These springs clips are of the so-called inverted type and each of them embraces a yieldable extremity 16 turned back upon the main body of the clip and facing radially outwardly.

Cooperable with the wheel structure for substantially covering an outer side of the body and rim parts, is a cover designated generally by the reference character 20 and which, with the exception of the reinforcing rings to be hereinafter described, is made of a suitable plastic material. Excellent results may be attained by making this cover, as well as any of the covers of the forms to be hereinafter described, of a plastic such as ethyl cellulose, vinyl resin, etc.

The cover 20 comprises radially inner and outer concentric but generally divergent portions 21 and 22 connected by a turned junction 23.

The inner or central cover portion 21 is formed at its center into a crown shape so as to simulate a hub cap. The outer portion 22 extends radially and axially inwardly from an outer turned edge 24 to the turned junction portion 23. This outer portion, as is true in the case of all the forms of my invention, is of such radial depth and curvature and in such close proximity to the outer side wall of the tire that, in use, it will appear to constitute a radially inner part of the tire wall. This effect can be accentuated if this outer portion is given a white external finish in which event it will, in use, appear to constitute a white side wall part of the tire 9 thereby giving the tire a massive looking appearance.

The turned portion 23 also has formed integrally with it a double curved portion 25 which defines a radially outwardly projecting annular rib 26. In reality, the turned portion 25 is of a generally S shaped cross-section so as to enable interlocking of the two metal rings 27 and 28 therewith on opposite sides of the cover 20.

The inner metal ring 27 has a radially outwardly projecting rib 29 which projects into the groove defined by and on the inner side of the cover rib 26. The ring 27 also includes a curved portion 30 conforming closely to the curvature of the cover portion 25 so as to back up and reinforce the same at the area where the cover is to be retained. The other and rear edge of the ring 27 is turned or curled, as shown at 31, thus defining a reinforced shoulder or edge for retaining cooperation with the free extremities 16 of the spring clips 15.

The ring 27 is snapped into the cover from the rear side thereof and is self-retained in the groove of the cover rib 26. This snap on action is permitted by the natural inherent resiliency of the plastic material in the main cover 20. The outer ring 28 is in the form of a hollow bead having underturned marginal edges 32 and 33. The edge 32 is slightly inclined and is adapted to be cammed over the cover rib 26 into retained cooperation with the back side of the same. It should also be noted that this turned outer edge 32 of the bead 28 is bottomed in the turned junction portion 23 of the cover.

The turned radially inner edge 23 of the cover is adapted to tightly embrace the curved portion 25 of the cover opposite the backing afforded by the edge portion 30 of the inner reinforcing ring 27.

In the assembling of the cover, the bead is aligned with the intermediate junction 23 and is then pressed axially home into the position shown in Figure 3 where it is self-retained on the cover. The bead 28 may be given any lustrous finish and if it is so desired may be made of stainless steel. This enables a very highly desirable color effect, particularly if the portions 21 and 22 are made in contrasting colors.

In the application of the cover to the wheel, as is true in all forms of the invention, the cover is first placed over the side of the wheel until its outer turned edge 24 engages the outer edge of the tire rim 10 in close proximity to the tire. In pressing the cover home the turned edge 31 of the inner reinforcing ring 27 deflects the spring clips 15 radially inwardly to an extent sufficient to enable the edge 31 to be wedged tightly between the free extremities 16 of the clips and the depressed portion 13 of the wheel body part as shown in Figure 2.

When in this position the cover is held in tensioned engagement at its outer edge 24 with the tire rim 10 and at its junction portion 23 with the body part 12.

An advantage of this structure is that the resiliency of the material of the cover may be utilized to accommodate manufacturing variations in the rim and body parts of the wheel so that the cover can self-adjust itself to these parts. Moreover, the retaining pressure exerted by the spring clips is applied directly to the metal ring 27 rather than to the material of the cover 20 thereby relieving the cover of undue stress and pressure tending to distort or damage the same. This is true of all the forms of the invention wherein an inner reinforcing ring is employed for this purpose. Moreover, in each case the outer bead serves to assist in reinforcing the cover at the junction of the radial inner and outer portions and directly opposite the area at which the cover retaining pressure is applied.

In the form of Figure 4, the body part 42 of the wheel is of a slightly different construction from that of the body part 12 but it does have a centrally depressed portion 43 and a bolt-on flange 44 corresponding to flange 14. The bolt-on flange 44 also has hub cap or cover retaining spring clips 45.

In this form the plastic cover is designated generally by the reference character 50 and is quite similar to the previous cover 20 with the exception of the construction and arrangement of the reinforcing metal rings 51 and 52.

The inner metal ring 51 has its outer margin formed into opposite curved portions 53 for tightly embracing the similarly curved junction of the two cover portions 48 and 49. It will be noted again here that the cross section of this curve generally resembles an S so that the outer margin of the ring 51 can be interlocked with the resilient material of the plastic cover 50. The inner ring 51 also includes a flattened intermediate portion 54 underlying a part of the radial inner cover portion 49 and terminates in a generally axially extending leg 55 having a curved inner margin 56 for nesting engagement with the nose of the body part 43. The extreme inner edge of the ring is slightly curled at 57 to reinforce the same and to provide a shoulder for retaining cooperation with the spring clips 45 in much the same manner as the edge 31 cooperates with the clips 15 in the first form.

The outer metal ring 52 is formed in the shape of a hollow bead and closely resembles the bead 28. It is applied in substantially the same way as the bead 28 and serves the same purpose as that of the bead 28.

The operation and use of this part of the cover is substantially the same as that of the previous one.

In Figure 5, the body part 62 of the wheel is again of a slightly different contour and includes a depressed annular shoulder 63 defining an annular seat for the whel cover designated generally by the reference character 70. The body part 62 also has a radially extending bolt-on flange 64 to which is attached a plurality of spring clips 65 which are similar to the previously described hub cap or cover retaining clips.

The plastic cover 70 includes radially inner and outer portions 68 and 69 joined by a turned intermediate portion 71 adapted to seat in the annular depression 63 of the body part.

The junction portion 63 of this plastic cover 70 is reinforced by radially inner and outer metal rings 72 and 73 which perform substantially the same purpose as that of the previously described rings.

The inner ring 72 has an annular bead 74 snapped into a bead 75 in the plastic cover at the junction 71. In this form, as distinguished from the previous one, the spring clips are adapted to engage the bead portion 74 of the ring 72 for the purpose of holding the cover on the seat 63. Moreover, in this case, instead of metal to metal contact, the turned portion 71 of the cover 70 is held against the metal body part in the annular seat 63.

The outer ring or bead 73 is similar to the previously described rings 28 and 52 with the exception that it is corrugated to enhance its appearance.

Now referring to the form shown in Figure 6, it will be perceived that it closely follows the form of Figure 4 with the principal exception that the inner reinforcing ring comprises two nested sections instead of a single section. Moreover, the same reference numerals are employed in this form as are used in Figure 4 to designate parts common to the two figures. The plastic cover is designated generally by the reference character 50 and includes radially outer and inner divergent portions 48—49 having nested and retained in their junction the outer ornamental ring or bead 52.

The inner side of the junction of the cover is reinforced by a metal ring 80 which is generally of an S shape cross section and tightly conforms with the inner contour of the cover. This ring 80, however, terminates short of the center of the wheel and a separate ring 81 is employed for holding the cover in retained cooperation with the spring clips 45.

This separate metal ring 81 has its outer margin 82 formed into a tortuous shape so as to be resiliently nested on the radially inner side of the ring 80 thereby interlocking it to the cover. The inner margin of the ring 81 is turned at 83 to form a shoulder for snap on detachable engagement with the spring clips 45. With the exception of the two piece inner ring structure for reinforcing the cover this form of the invention is substantially identical to the form shown in Figure 4.

In Figure 7 the body part 85 of the wheel is of a substantially different construction than that of the previously described wheels. In this form the body part has an axially bulged nose 86 defining a radially outwardly facing annular shoulder 87 having formed thereon a plurality of circumferentially spaced protuberances 88 for retaining the cover on the wheel. The cover 50 is substantially identical to the cover 50 shown in Figure 6 with the exception that the separate retaining ring 81 is omitted. In lieu thereof the inner retaining ring 80 is snapped over and into retained engagement with the protuberances 88 to hold the cover on the wheel and against the shoulder 87. The outer annular bead 52 is the same as the previously described beads and serves the same purpose.

In all forms of the invention the cover is applied by pressing it home axially into retained engagement with the retaining elements on the wheel irrespective of whether these are spring clips or spaced protuberances. In addition, in all forms the cover may be removed by pulling it off of the wheel or by flexing its outer margin away from the wheel and inserting a pry-off tool therebehind to engage between the junction portion of the cover and the body part to forcibly pry the cover off the wheel. That is to say, the outer radial portion of each of the plastic covers can be pulled slightly away from the wheel to an extent sufficient to permit of the insertion of a pry off tool such as a screw driver therebehind.

Needless to say upon release of the deflecting pressure the outer portion of the cover will of its own accord spring back to substantially its original contour without any permanent deformation thereof. Furthermore, in each of the covers the central crown portion of the cover, upon being slightly indented due to a blow or the like will of its own accord tend to spring back to its original contour thereby lessening the possibility of marring and denting the cover.

I claim as my invention:

1. In a cover structure for a wheel including a tire rim and a body part having cover retaining means, a circular wheel cover of resiliently pliable material self-sustaining as to form and resiliently deflectable without permanent deformation, said cover having radially inner and outer concentric portions for disposition over the tire rim and body part and having at their junction a substantially radially outwardly projecting annular rib defining an annular groove on the rear side of the cover, a reinforcing ring of more rigid material having a radially outwardly projecting rib portion snapped into said groove to retain the ring on the rear side of the cover and also having a shoulder portion for engagement by said retaining means to hold the cover on the wheel, and an outer reinforcing ring engaging the cover at the axially inner side of the rib and clamping it against the first mentioned ring.

2. In a cover structure for a wheel, including a tire rim and a body part having cover retaining means, a circular wheel cover of resiliently pliable material self-sustaining as to form and resiliently deflectable without permanent deformation, said cover having radially inner and outer concentric portions for disposition over the tire rim and body part and having at their junction a substantially radially outwardly projecting annular rib defining an annular groove on the rear side of the cover, a reinforcing ring of more rigid material having a radially outwardly projecting rib portion snapped into said groove to retain the ring on the rear side of the cover and also having a shoulder portion for engagement by said retaining means to hold the cover on the wheel, and an outer reinforcing ring engaging the cover at the axially inner side of the rib and clamping it against the first mentioned ring, said radially outer cover portion extending generally radially and axially inwardly from an outer edge of the tire rim to said junction directly over the body part of the wheel.

3. In a cover structure for a wheel including a tire rim and a body part having cover retaining means, a circular wheel cover of resiliently pliable material self-sustaining as to form and resiliently deflectable without permanent deformation, said cover having radially inner and outer concentric portions for disposition over the tire rim and body part and having at their junction a substantially radially outwardly projecting annular rib defining an annular groove on the rear side of the cover, a reinforcing ring of more rigid material having a radially outwardly projecting rib portion snapped into said groove to retain the ring on the rear side of the cover and also having a shoulder portion for engagement by said retaining means to hold the cover on the wheel, said ring having between said rib and said shoulder portions a bulged flattened portion engaging the rear side of the radially inner portion of the cover to back up and reinforce the same, and a circular member retainingly engaging over the outer side of said rib and clamping the cover to said reinforcing ring.

4. In a cover structure for a wheel including a tire rim and a body part having cover retaining means, a circular wheel cover of resiliently pliable material self-sustaining as to form and resiliently deflectable without permanent deformation, said cover having radially inner and outer concentric portions for disposition over the tire rim and body part and having at their junction a substantially radially outwardly projecting annular rib defining an annular groove on the rear side of the cover, a reinforcing ring of more rigid material having a radially outwardly projecting rib portion snapped into said groove to retain the ring on the rear side of the cover and also having a shoulder portion for engagement by said retaining means to hold the cover on the wheel, and an annular bead on the outer side of the cover extending into said junction and retainingly engaging said annular cover rib to reinforce the cover on its outer side and opposite said ring.

5. In a cover structure for a wheel including a tire rim and a body part having cover retaining means, a circular wheel cover of resiliently pliable material self-sustaining as to form and resiliently deflectable without permanent deformation, said cover having radially inner and outer concentric portions for disposition over the tire rim and body part and having at their junction a substantially radially outwardly projecting annular rib defining an annular groove on the rear side of the cover, a reinforcing ring of more rigid material having a radially outwardly projecting rib portion snapped into said groove to retain the ring on the rear side of the cover and also having a shoulder portion for engagement by said retaining means to hold the cover on the wheel, and an annular bead on the outer side of the cover extending into said junction and retainingly engaging said annular cover rib to reinforce the cover on its outer side and opposite said ring, said bead including an underturned marginal portion snapped over and behind said cover rib in the junction.

6. In a cover structure for a wheel including a tire rim and a body part having centrally arranged hub cap retaining means, a circular wheel cover of resiliently pliable material self-sustaining as to form and resiliently deflectable without permanent deformation, said cover including radially inner and outer divergent portions connected by a turned junction portion of generally S shaped cross section including two oppositely curved legs, a curved metal ring on the rear side of said cover for cooperation with said retaining means and retainingly embracing at least one of said curved legs for reinforcing the cover at said junction, and an annular bead on the outer side of said cover in said junction portion retainingly wedged behind one of said curved legs for reinforcing the outer side of the cover at said junction, said bead including an underturned marginal portion constructed and arranged to be cammed edgewise over the cooperating curved leg of the cover so as to be self-retaining on the cover.

7. In a cover structure for a wheel including a tire rim and a body part having centrally arranged hub cap retaining means, a circular wheel cover of resiliently pliable material self-sustaining as to form and resiliently deflectable without permanent deformation, said cover including radially inner and outer divergent portions connected by a turned junction portion of generally S shaped cross-section including two oppositely curved legs, a curved metal ring on the rear side of said cover for cooperation with said retaining means and retainingly embracing at least one of said curved legs for reinforcing the cover at said junction, said ring extending generally radially inwardly from said junction behind the radial inner portion of the cover to reinforce and back up the same and having a turned inner margin providing a shoulder for snap-on cooperation with said retaining means, and a circular member engaging over the outer side of the cover at said juncture and having a radially inwardly extending portion clamping an interposed portion of the cover juncture against the retaining ring.

8. In a cover structure for a wheel including a tire rim and a body part having centrally arranged hub cap retaining means, a circular wheel cover of resiliently pliable material self-sustaining as to form and resiliently deflectable without permanent deformation, said cover including radially inner and outer divergent portions connected by a turned junction portion of generally S-shaped cross section including two oppositely curved legs, one of said legs affording a rib projecting substantially radially outwardly in the junction margin of said inner cover portion, a curved metal ring on the rear side of said cover for cooperation with said retaining means and retainingly engaging in said one curved leg for reinforcing the cover at said junction, and an annular bead on the outer side of said cover in said junction portion retainingly wedged axially inwardly of said one curved leg rib for reinforcing the outer side of the cover at said junction.

9. In a cover structure for a wheel including cover retaining means, a circular wheel cover of resiliently pliable material self-sustaining as to form and resiliently deflectable without permanent deformation, said cover including radially inner and outer divergent portions connected by a turned junction portion of generally S-shaped cross section, a metal reinforcing ring of generally S-shaped cross section complementary to the cross section of said junction portion and internested with said junction portion at the inner side of the cover and including means for cooperation with said cover retaining means, and means engaging said junction portion at the outer side of the cover and acting to retain the junction portion in internested relation with said S-shaped reinforcing ring.

10. A cover structure for a wheel including cover retaining means, a circular wheel cover of resiliently pliable material including radially inner and outer divergent portions connected by an axially inwardly extending junction portion, a reinforcing ring engaging said junction portion at the inner side of the cover, a second reinforcing ring engaging said junction portion at the outer side of the cover and cooperating with said inner reinforcing ring to retain said junction portion and inner reinforcing ring assembled, and a third ring assembled with said inner reinforcing ring and including means for engagement with said cover retaining means.

11. In a cover structure for a wheel including cover retaining means, a circular wheel cover of resiliently pliable material including radially inner and outer divergent portions having an axially inwardly projecting junction portion, said radially outer cover portion being resiliently flexible axially away from the wheel for access behind the outer cover portion but being resiliently returnable to original position when released from the deflecting force, a reinforcing member engaging the inner side of the junction portion and including means for engagement with said cover retaining means, said junction portion and said reinforcing member including internested generally radially outwardly ribbed portions, and an outer reinforcing member engaging within the outer side of said junction portion axially inwardly of the junction portion rib to maintain the cover and reinforcing members in assembly and also engaging the junction portion at substantially the opposite side of the junction at the radially inward junction margin of said radially outer cover portion.

GEORGE ALBERT LYON.

REFERENCES CITED

The following references are of record in the file of this patent:

UNITED STATES PATENTS

| Number | Name | Date |
|---|---|---|
| D. 141,508 | Lyon | June 5, 1945 |
| D. 141,509 | Lyon | June 5, 1945 |
| 1,234,387 | Pugh et al. | July 24, 1917 |
| 1,948,273 | Lyon | Feb. 20, 1934 |
| 2,022,128 | Lyon | Nov. 26, 1935 |
| 2,148,210 | Lyon | Feb. 21, 1939 |
| 2,193,106 | Lyon | Mar. 12, 1940 |